(12) United States Patent
Gupta et al.

(10) Patent No.: US 10,306,063 B2
(45) Date of Patent: May 28, 2019

(54) METHOD AND SYSTEM FOR OMNICHANNEL SUPERVISION

(71) Applicant: Cisco Technology, Inc., San Jose, CA (US)

(72) Inventors: Ruchi Gupta, Sunnyvale, CA (US); Vipin Palawat, Westford, MA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 99 days.

(21) Appl. No.: 15/371,248

(22) Filed: Dec. 7, 2016

(65) Prior Publication Data

US 2018/0159978 A1   Jun. 7, 2018

(51) Int. Cl.
*H04M 3/51* (2006.01)

(52) U.S. Cl.
CPC ....... *H04M 3/5175* (2013.01); *H04M 3/5141* (2013.01); *H04M 3/5133* (2013.01); *H04M 3/5191* (2013.01); *H04M 2201/40* (2013.01); *H04M 2203/558* (2013.01)

(58) Field of Classification Search
CPC ................................................ H04M 2201/40
See application file for complete search history.

(56) References Cited

U.S. PATENT DOCUMENTS

| | | |
|---|---|---|
| 7,984,007 B2 | 7/2011 | Reumann et al. |
| 9,031,222 B2 | 5/2015 | Wolfeld et al. |
| 9,160,852 B2 | 10/2015 | Ripa et al. |
| 9,311,285 B2 | 4/2016 | Lynch et al. |
| 2015/0237128 A1 | 8/2015 | Castro et al. |
| 2017/0054850 A1* | 2/2017 | Lintner .................. H04L 67/24 |
| 2018/0007204 A1* | 1/2018 | Klein .................. H04M 3/5191 |
| 2018/0091652 A1* | 3/2018 | Lakdawala ......... H04M 3/5175 |

OTHER PUBLICATIONS

Chang, Cindy; Omni-Channel for Supervisors (2016).
EGain; Contact Centers—Average Handle Time (2016) Can be seen at: http://www.egain.com/solutions/contact_centers/.
Guta, Michael; Engage 6.5 Delivers Omni-Channel Recording Platform (Jul. 15, 2016).
Nice; Nice Air & Engage Platform—Multi-Channel Interaction Recording (2016) Can be seen at: http://www.nice.com/engage/workforce-optimization/cross-channel-interaction-recording.
Nuvia; Contact Center Tools (2016) Can be seen at: http://www.nuviacloud.com/contact-center/contact-center-tools.

(Continued)

*Primary Examiner* — Harry S Hong
(74) *Attorney, Agent, or Firm* — Polsinelli PC

(57) ABSTRACT

In one embodiment described herein, an omnichannel supervision interface system and method includes a hardware processor, and a graphics engine executed by the processor for displaying a first portion to display, for one contact center agent among a plurality of contact center agents, a near-real time transcript of the contact center agent's conversation with one customer over a plurality of channels, and a second portion to display a first media category of a session of the contact center agent and the customer, wherein the omnichannel supervision interface is operative to display a plurality of channels for the plurality of contact center agents. Related methods, apparatus, and systems are also described.

20 Claims, 5 Drawing Sheets

(56) References Cited

OTHER PUBLICATIONS

Rowan, Ray; Analytics in the Contact Center, The Road to a Better and More Profitable Customer Experience (2011).
Salesforce; Salesforce Winter '17 Release Notes (Sep. 2016).
Sedlar, Urban et al.; Contextualized Monitoring and Root Cause Discovery in IPTV Systems Using Data Visualization; in IEEE Network, vol. 28, No. 6, pp. 40-46, Nov.-Dec. 2012.
Sreedhar, Suhas; Struggling with Omnichannel? The Internet of Things Can Help (Dec. 23, 2014).
Stangel, Luke; How Customer Service Tools are Going Mobile (Jun. 2, 2014).

* cited by examiner

METHOD AND SYSTEM FOR OMNICHANNEL SUPERVISION

TECHNICAL FIELD

The present disclosure generally relates to methods and systems for use in supervision of omnichannel systems for monitoring customer to business support interactions.

BACKGROUND

Contact centers are typically busy places where service agents interact with customer calls over a variety of channels, including, but not necessarily limited to: chats, emails, and so forth, while supervisors monitor their progress and manage the volume of issues coming in across all channels. It is important for the work of service agents to be monitored carefully and to be strategically thought-out, since every interaction with a customer costs the business money. Service agents can be co-located together with their supervisor. Service agents can also work as remote employees, a model which is becoming more commonplace as costs are often lower.

Although contact center supervisors serve a managerial role, they often function as mentors, motivators, managers, as well as service agents, in a task requiring supervisors to function as multitaskers as well. They often lead teams of 10-20 agents, and must manage volume across all service channels that are coming into the contact center. At any point, supervisors can be called upon to manage and coach agents, handle tough customers, adjust staff, prepare reports for management, all while ensuring service level and quality objectives are maintained.

Traditionally, supervisors monitor how agents are performing at their jobs to make sure they are productive and working efficiently on all the issues coming in. This often includes looking to standard call center metrics such as an agent's average handle time (AHT) or average speed to answer (ASA), but there is a host of other data the supervisor can look into to get a sense of an agent's workload and performance. Supervisors often walk around the floor to get a sense for how things are going by watching the agents and listening to conversations, while maintaining visibility for agents to ask them questions as well. However, it can be difficult to get that same feel for how an agent is doing when the supervisor or agent is remote.

BRIEF DESCRIPTION OF THE DRAWINGS

The present disclosure will be understood and appreciated more fully from the following detailed description, taken in conjunction with the drawings in which.

DESCRIPTION OF EXAMPLE EMBODIMENTS

Overview

An omnichannel supervision interface system and method is described. The omnichannel supervision interface system and method includes a hardware processor, and a graphics engine executed by the processor for displaying a first portion to display, for one contact center agent among a plurality of contact center agents, a near-real time transcript of the contact center agent's conversation with one customer over a plurality of channels, and a second portion to display a first media category of a session of the contact center agent and the customer, wherein the omnichannel supervision interface is operative to display a plurality of channels for the plurality of contact center agents. Related methods, apparatus, and systems are also described.

EXAMPLARY EMBODIMENT

Figure 1:
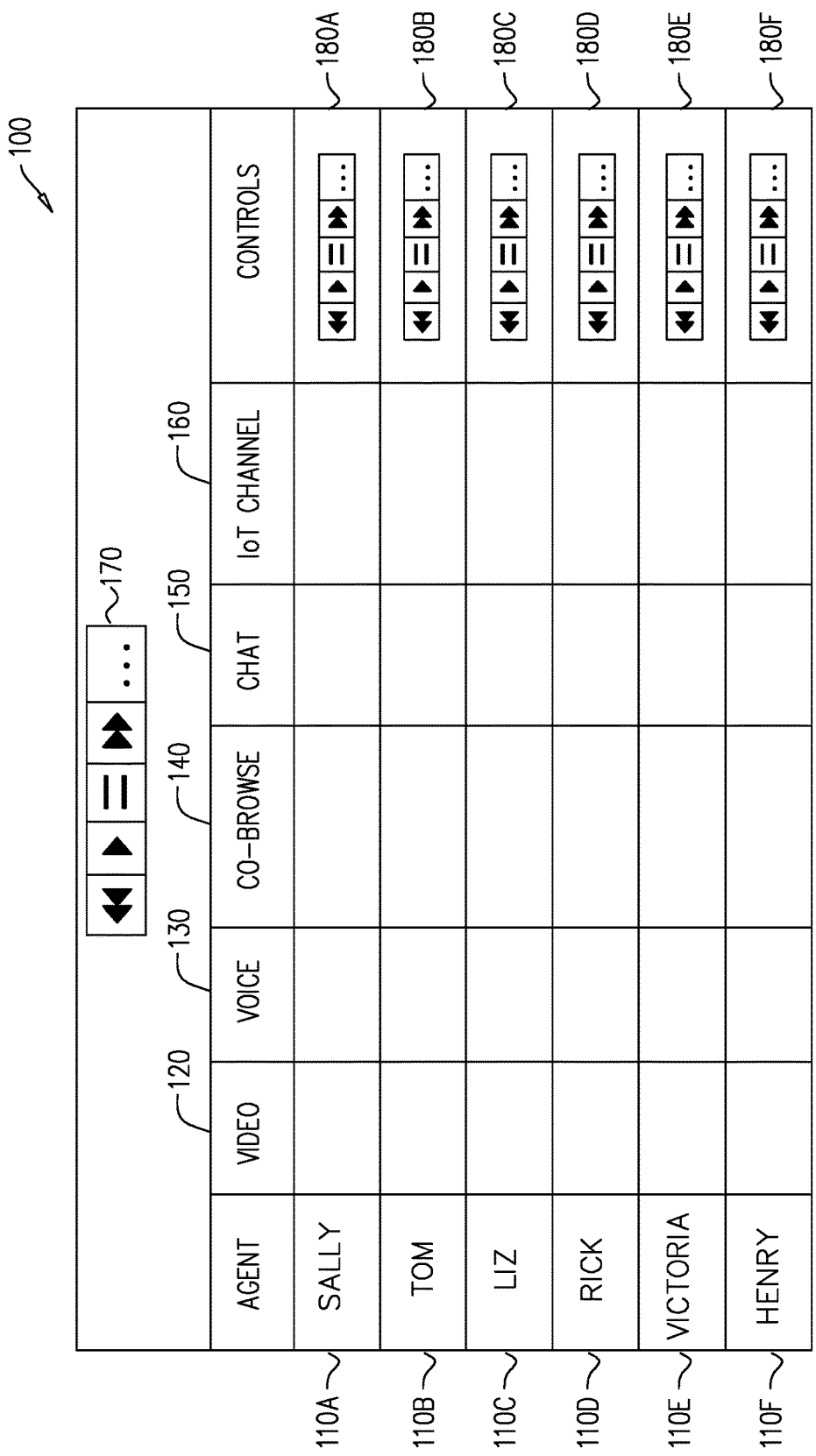
FIG. 1 is a simplified pictorial illustration of an interface for monitoring and time lapse recording of multiple omnichannel sessions constructed and operative in accordance with an embodiment of the present disclosure.

Reference is now made to FIG. 1, which is a simplified pictorial illustration of an interface 100 for monitoring and time lapse recording of multiple omnichannel sessions constructed and operative in accordance with an embodiment of the present disclosure. In a typical omnichannel contact center, supervisors may want access to real-time views of which agents are working, which customers are waiting to be served, and what work is in progress in order to monitor performance and proactively take informed action to resolve issues. These issues may include bottlenecks or over-saturated queues for example, that cause customers to suffer long wait times, and it's often up to the supervisor to adjust staff or shift priorities in such situations. It is appreciated that the term "customer" is used herein throughout to refer to a consumer of the services provided by the omnichannel contact center. Other terms may be used as well to refer to a consumer, depending on context. For example, a customer executing a voice call may be referred to as a "caller", or a customer who has executed a chat may be referred to as a "chatter". Other terms may be used as well in their appropriate context, as will be appreciated.

Often there is a need for supervisory monitoring either for compliance, coaching, or for quality reasons. FIG. 1 depicts an interface 100 which is designed to enable monitoring and recording multiple interactions—i.e. interactions of multiple agents 110A-110F. The interface 100 also provides for monitoring multiple channels. In the depiction of FIG. 1, columns for video 120, voice 130, co-browsing 140 (i.e., both the customer and the service agent see the same browser, typically enabled by using screen sharing software), chat 150, and feeds from Internet of Things (IoT) 160 enabled devices are shown. Other channels, including, but not limited to screen sharing may also be displayed in other columns. All of the above are displayed on the interface 100 simultaneously in real-time or near-real-time fashion.

In addition to being displayed on the interface 100 as described above, the information presently displayed on the interface 100 is also stored for retrieval and analysis at a later time. A first set of controls 170 is available to enable viewing information and events displayed in the interface 100 as a whole, and a set of controls 180A-180F is also provided on a per agent basis for each of the multiple agents 110A-110F, enabling viewing information and events for each individual agent of the multiple agents 110A-110F. The controls are depicted as being the standard symbols used according to IEC 60417—Graphical Symbols for Use on Equipment. These controls enable viewing the stored information in a time lapse fashion, where the information can be viewed on the interface at a speed faster or slower than the original capture rate of the information.

The information displayed is captured is across channels (e.g., voice/video/chat/screen capture etc.) for a particular user to support expert interaction. The retrieval or playback is assembled and displayed in a seamless way such that if the interaction started with a text chat, the text chat is displayed first, and an ensuing video call is then displayed. A session may be played back in a complete fashion, enabling fast forwarding or rewinding during the playback, using the controls 180A-180F. Key words may be highlighted during playback as will be described below with reference to FIG. 2.

It is appreciated that the interface 100 events as they unfold across all channels of the displayed omnichannels. Additionally, the interface enables time lapse recording of these events, and at a later time, playback of the time lapse recording may be performed at the same time for many of the channels or all of the channels. In that a supervisor may need to monitor a large number of agents, such as the multiple agents 110A-110F, and follow their interactions over a large number of channels, corresponding to the various columns, e.g. video 120, voice 130, co-browse 140, chat 150, etc.), the interface 100 provides a system which may help the supervisor perform his or her job. Additionally, the interface 100 may comprise a machine learning sub-system which, over time, will improve at detecting and isolating areas for the supervisor to focus on. The interface 100 may then bring these areas to the attention of the supervisor.

The machine learning sub-system may be used both in real time, in order to detect a potential problem, and then to send a notification to the supervisor, or, alternatively, in reviewing interactions in an off-line, non-real time fashion, to spot interactions where the supervisor's intervention should have occurred, or where additional follow-up may be necessary on the part of the supervisor (whether in the form of agent training or in the form of contact with a customer). In that there may be a large volume of customer interactions handled by the omnichannel contact center, it may not be possible to review each interaction individually in its entirety in order to isolate problem areas. The machine learning sub-system (and its associated processing unit) enables off-line location and identification of such problem areas. The machine learning sub-system may also prioritize the problematic interactions for which are to be reviewed.

Although not depicted, the interface 100 might also display a timer for each ongoing interaction between an Agent and a customer. A conversation that goes beyond a limit/threshold from average talk time will be flagged for further attention by the supervisor. The flagging will typically be executed by a rule engine (described below, with reference to FIG. 4). During omnichannel conversation, it is important to note the total time for resolution from start to end, and this time may include time spent engaged in offline conversations like email or SMS. Total time of resolution and number of contacts before resolution is an important parameter that gets tracked and linked directly to customer satisfaction. Information about timing may be performed by the omnichannel system so that supervisors can, if needed, take actions in near real time.

Exemplary detailed descriptions of each monitored channel will be provided in the following discussions.

Figure 2:
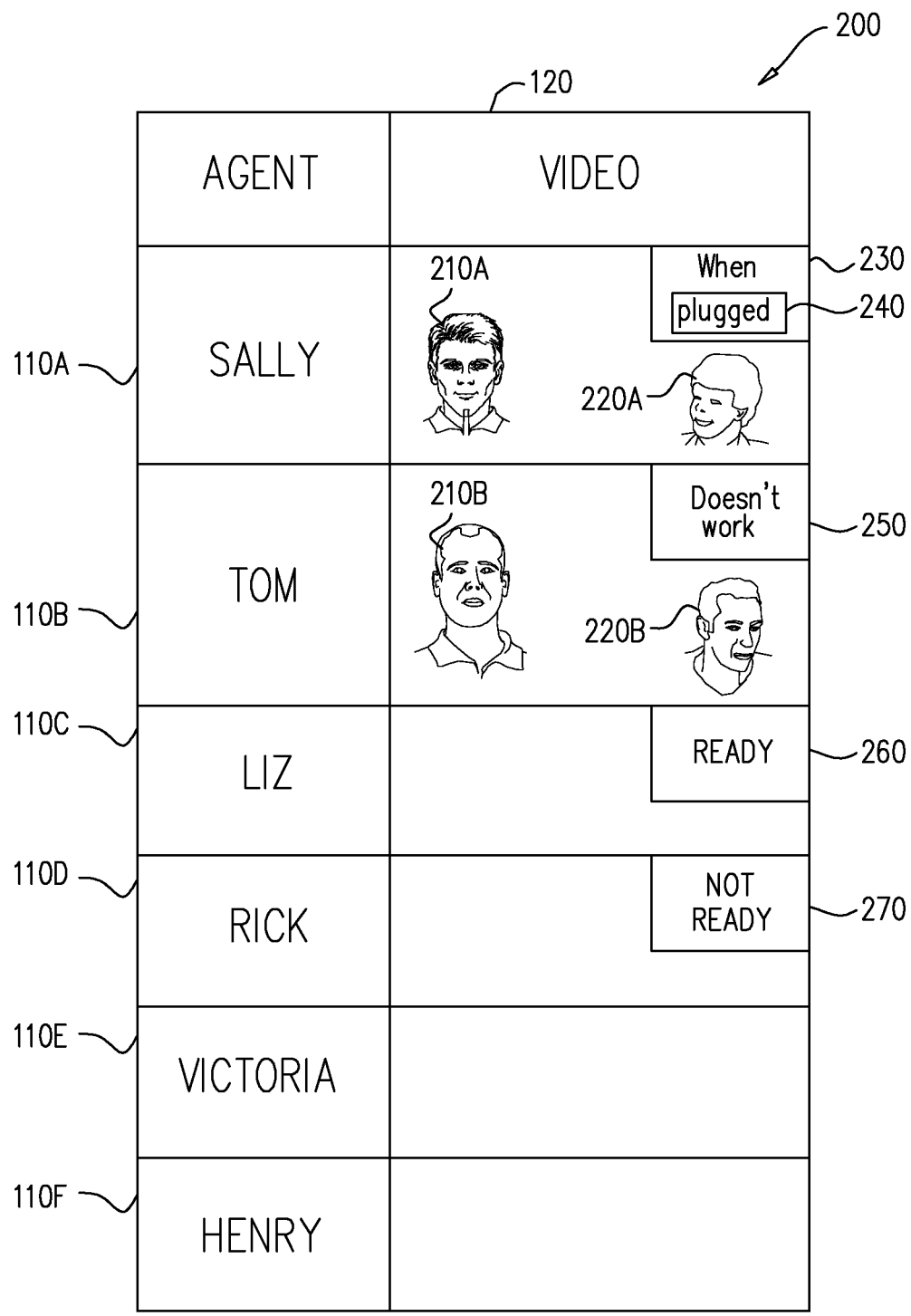
FIG. 2 is a detail of the interface of FIG. 1, focusing on the video column.

Reference is now made to FIG. 2, which is a detail 200 of the interface 100 of FIG. 1, focusing on the video column 120. Focusing on the video column 120 grid of Agent Sally 110A, a customer video 210 A is seen. Agent Sally's video 220A is also seen, as a small video display, in addition to the customer video 210 A. A transcript 230 is also provided of the conversation between the customer, displayed by customer video 210 A and Agent Sally's video 220A. The transcript 230 show a highlighted word 240, depicted as a rectangle around a word, "plugged". The highlighted word 240 is a keyword which is highlighted as part of the transcription routine.

Similarly, Agent Tom's video 210 is displayed, in this case, it is Agent Tom 110B himself shown, and the customer's video 220B which appears as the smaller video image. In either of the cases of the two video displays, 210A and 210B, it is the active member of the video session whose video image 210A, 210B is displayed in the larger display, while the listening member of the video session whose video image 220A, 220B is displayed in the smaller display. At present, the transcript 250 of the conversation between Agent Tom 110B and a customer receiving help from Agent Tom 110B is not showing any highlighted keywords. In some embodiments, tagging might also be implemented. For example, if the call center agent is discussing (regardless of the channel) a refrigerator, then the tag "refrigerator" might be automatically applied to the conversation.

Agent Liz 110C is indicated as being ready 270 to receive a call from the next customer to the call center. By contrast, Agent Rick 110D is indicated as not being ready 270 to receive a call. This might be because Agent Rick 110D is on a break or not at his desk at present.

As can be seen in the above description of FIG. 2, any individual can monitor and record multiple interaction sessions with multiple media types or channel types. FIG. 2 depicted the ability to monitor multiple interaction sessions for video. The depiction of FIG. 2 illustrates how the omnichannel support center supervisor can monitor multiple video sessions at one time.

Figure 3:
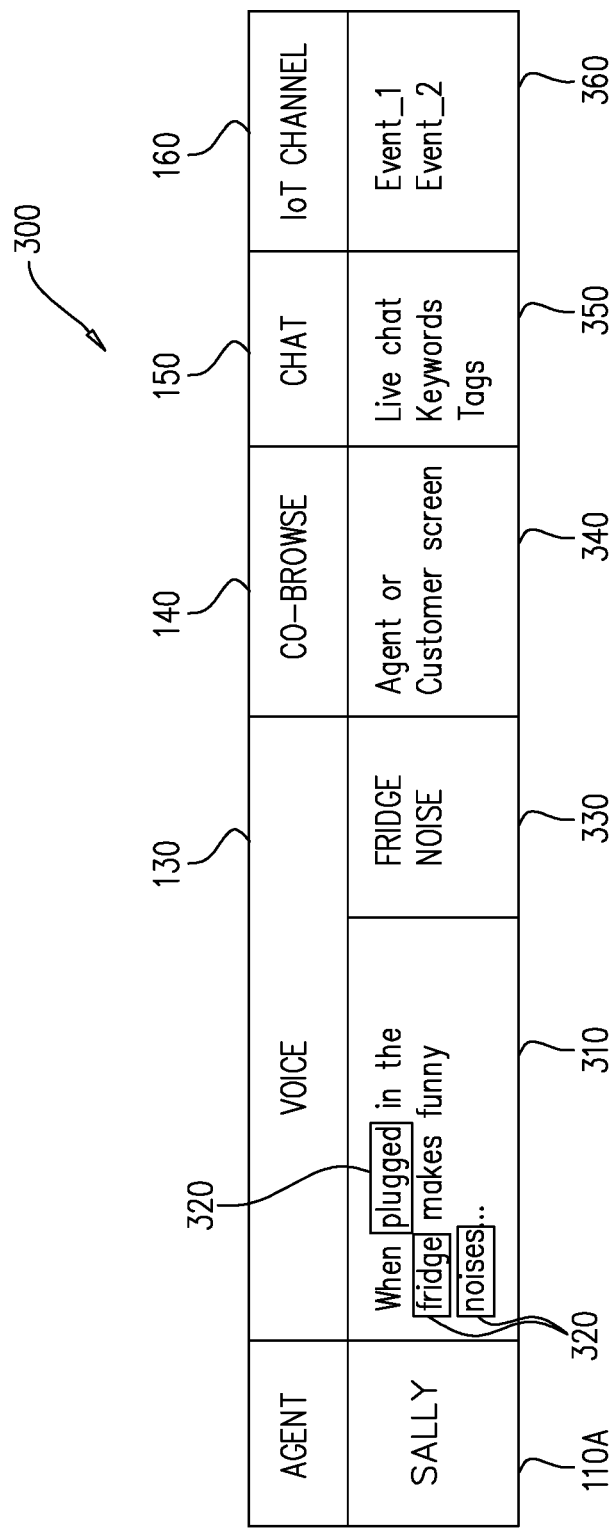
FIG. 3 is a detail of the interface of FIG. 1, focusing on the row of one agent.

Reference is now made to FIG. 3, which is a detail 300 of the interface of FIG. 1, focusing on the row of one agent, in this particular instance, and by way of example, Agent Sally 110A. Similar to what was discussed above about FIG. 2, FIG. 3 depicts how multiple other channels besides video (the video column is omitted from FIG. 3, for ease of depiction) may be displayed for monitoring at one time. As with video, in the voice column, a live transcript appears, showing several keywords 320, depicted with rectangles around them, for emphasis. One repeated keyword, multiple times, might serve as a flag to the supervisor that immediate attention or intervention is called for. For example, repeated use of profanity might be flagged (possibly in a red font, or in bold letters, or some other manner, as is known in the art). Similarly, if the customer were to repeatedly use the same keyword, e.g. "Cloud . . . cloud . . . cloud . . . ", might serve as a flag to the supervisor that supervisory attention might be called for. The chat window might also have a tag sub-window 330, where tags (i.e. a displaying of metadata which might help to describe the subject of the voice (or video) session) are automatically applied. For example, tags might include topics of conversation, such as "Fridge" or "Noise".

The Co-browse column enables displaying a screen from the Agent's monitor and/or the a screen from customer's monitor 340. The Chat column 150 might function similarly to the video transcripts 230, 250 displayed for the video column 120 (FIG. 2) and the voice transcript 310 displayed for the voice column 130. That is to say that live chat keywords and tags 350 might appear in the chat column 150.

Tags can be added to a tagging system (not depicted) by system administrators. At a later time, when a chat or a transcript appears in the appropriate location in the interface 100 (i.e. the chat columns 150, the transcript 230, etc., the system would then highlight keywords. Additionally, the system might display, for each tagged word, a number of times the word was spoken or mentioned in the conversation. The system can use a rule engine (described below with reference to FIG. 4), and monitor if a specific word is repeated too many times based on a threshold, and then start tracking the conversation as an interesting event in timeline and time lapse recording. As such, the system is able to create static tags but may then learn tags, via the machine learning sub-system and automatically adjust the administrator list of tags in a dynamic manner. In some embodiments, body language, gestures, and integrated machine learning and video analytics can trigger events and mark them in a timeline for either one or both of time lapse recording and/or real-time monitoring.

The IoT Channel column 160 may provide emails or other information made available by IoT devices in the possession of the customer. In keeping with the refrigerator example provided earlier (e.g. the tag "Fridge" in tag sub-window 330), if the refrigerator were an IoT enabled device (or "thing"), then IoT messages (e.g. error messages, etc.) may be routed to the call center agent, i.e. Agent Sally 110A. Such IoT messages would then also appear in the interface 100 (FIG. 1), in the IoT message window 360.

In that real time monitoring of multiple agents is typically difficult for one supervisor, the interface 100 also enables monitoring call duration, which is easier to monitor in real time. If a session with a customer is going on for what may be deemed a long time (e.g. longer than a given threshold, which may vary for different products), the supervisor may engage in more active monitoring or intervention.

Figure 4:
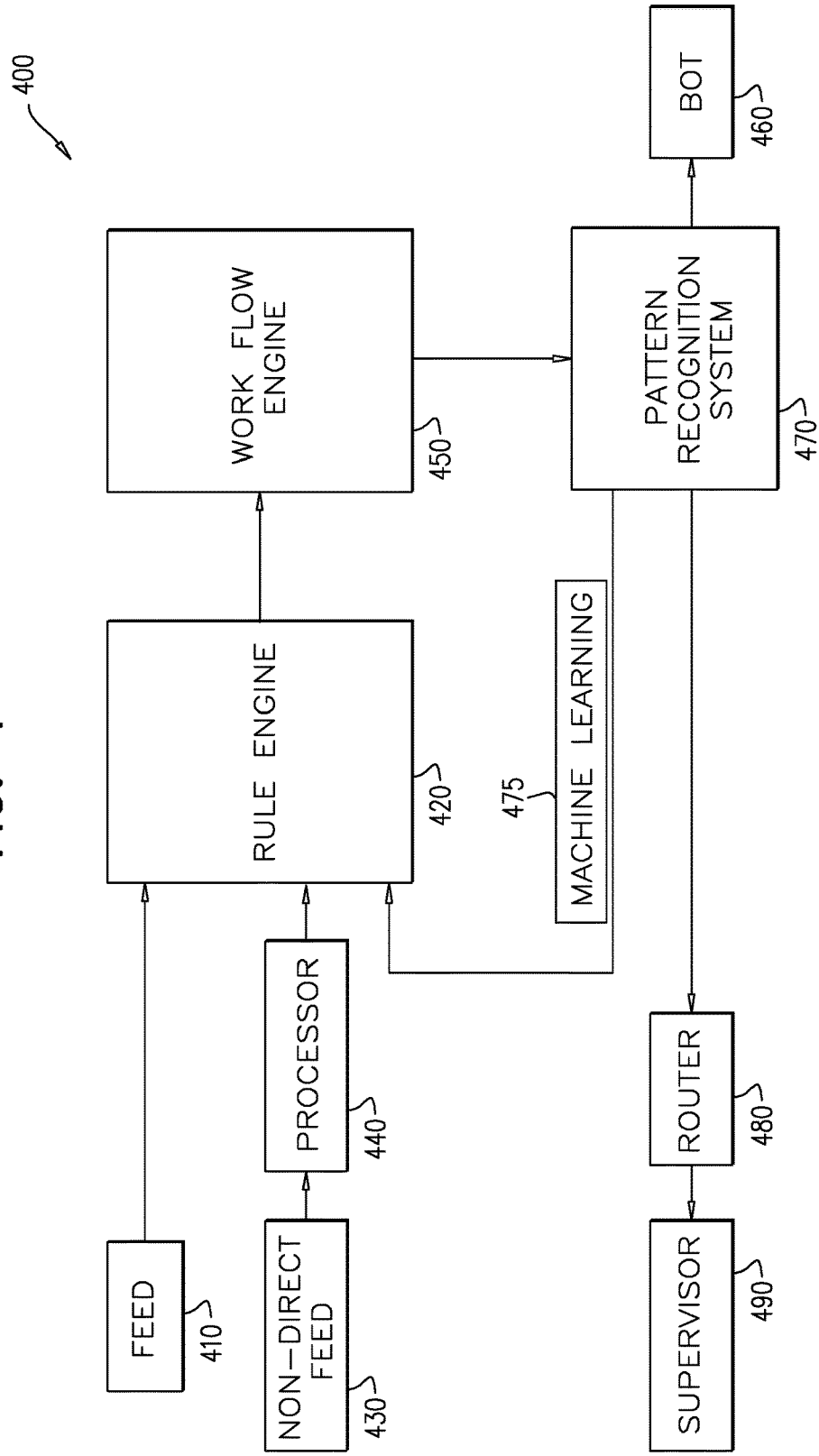
FIG. 4 is a simplified block diagram of the flow of data through the system of FIG. 1.

Reference is now made to FIG. 4, which is a simplified block diagram 400 of the flow of data through the system of FIG. 1. As noted above, there are several types of feeds which may be input into the system of FIG. 1. Referring, for example, to FIG. 1, Video 120, Voice 130, Co-Browsing 140, Chat 150, and IoT Channels 160 have already been discussed as "channels". It is appreciated, however, that "Channels" of communication are also feeds of data. The data flowing through the system of FIG. 1 is now discussed.

Some feeds 410, such as Video 120, Voice 130, Co-Browsing 140, Chat 150, may be input directly for processing by a rule engine 420. As is known in the art, a rule engine, such as rule engine 420, is a software system which executes one or more rules in a runtime production environment. Rules engines, such as rule engine 420, may be acquired, by way of example, as a ready-made product, or alternatively a custom made rules engine may be implemented in some embodiments.

Some feeds, however, may need preprocessing prior to being input into the rule engine 420. An indirect feed 430, by way of example, but not limited to an IoT feed, may require preprocessing by a processor 440 prior to being input to the rule engine 420. The processor 440 may be an IFTTT ("If This Then That") gateway, which is operating like a processor. As persons of skill in the art will appreciate, IFTTT is a web-based service that allows users to create chains of conditional statements which may be triggered based changes to some other web based service. So, by way of a non-limiting example, if customer contacts a call center about a refrigerator problem, and the call center agent runs diagnostics via the refrigerator's IoT interface, the results of the diagnostics may then be forwarded by the IFTTT gateway to the customer service agent and/or to the rule engine 420.

The rule engine 420 may operate as a general purpose engine which may also operate like a SQL (standard query language) engine. However, instead of acting on database data, the rule engine 420 may act upon incoming data from the feed 410 and processor 440. The rule engine 420 would output events which are relevant for display on the interface 100 (FIG. 1), such as IoT data, customer call information, and so forth. The rule engine 420 also dynamically evaluates incoming metadata in order to perform filtering of events which are associated with the metadata. For example, if there are certain keywords to be detected, then metadata for events which have strings matching those keywords may invoke the rules of the rule engine 420. Rules may also be adjusted dynamically based on pattern recognition and machine learning (as will be discussed below).

Once incoming events (i.e., events in the direct feed 410 and in the non-direct feed 430) are filtered by the rule engine 420, then the flow of events are further processed by a work flow engine 450. The work flow engine 450 is, as is known in the art, an application which manages and monitors the state of activities in a workflow. Work flow engines, such as work flow engine 450, may be acquired, by way of example, as a ready-made product, or alternatively a custom made work flow engine may be implemented in some embodiments.

The work flow engine 450 processes its input events into different streams, utilizing triggers, conditions (such as: "choose between this and that") and then outputs an outcome and/or an action. An outcome from the work flow engine 450 would either effect the action by an automated bot 460 based on pre-defined patterns determined by a pattern recognition system 470, or it would pass it on to a router engine 480 to be handled by the supervisor.

The pattern recognition system 470, enabling machine learning 475, may be situated in the system of FIG. 1 to receive an output from the work flow engine 450. The pattern recognition system 470, as is known in the art, executes machine learning that focuses on the recognition of patterns and regularities in data output by the work flow engine 450. The machine learning 475 result generated by the pattern recognition system 470 is input to the rule engine 420 in order to refine the rules used by the rule engine 420, so that data from the feeds 410, 430 may be processed by the rule engine 420 more efficiently going forward. Machine learning may be used to analyze the traditionally ignored rich data stream of interactions. Such events and triggers can then be used in order to have automated bots take an action, or to route the interaction to supervisors managing the team or, alternatively, managing certain types of events (e.g. there might be a manager who specializes in handling interactions with irate customers).

As stated above, the goal of the system of FIG. 1 for supervisors is to filter out noise (i.e., normal conversations) and pay attention to problems that are detected and assisted by the system to handle multiple channels (i.e., Video 120, Voice 130, Co-Browsing 140, and so forth), and multiple agents (i.e., 110A-110F) at the same time, all while the supervisor is managing the conversations and the agents from a single work station. Accordingly, the system will route a typical, "successful" session between a customer and an agent to the bot 460. As noted above, the bot 460 effects the actions resulting from outcomes of the workflow engine. A session in which a problem develops will, as explained below, be routed by router 480 to a supervisor 490.

Conversations which are not judged by the work flow engine 450 as being "normal" or "successful" conversations, but rather are deemed to require a supervisor's attention, will be routed by the system of FIG. 1, by the router 480 to a supervisor 490. It is appreciated that the router 480 will determine which supervisor 490 is the appropriate supervisor to forward such a conversation to. By way of example, the metadata of a given feed 410, 430 may include the name (or other identifying information) of its associated support agent. The router 480 may, for example, use a lookup table, and route conversations to the supervisor associated with the support agent associated with the conversation being forwarded.

The time lapse view supported by the interface 100 is the view of the targeted events across all channels that are filtered through the work flow engine 450 and allows the supervisor 490 to zoom into relevant areas without full review of an entire recording.

Figure 5:
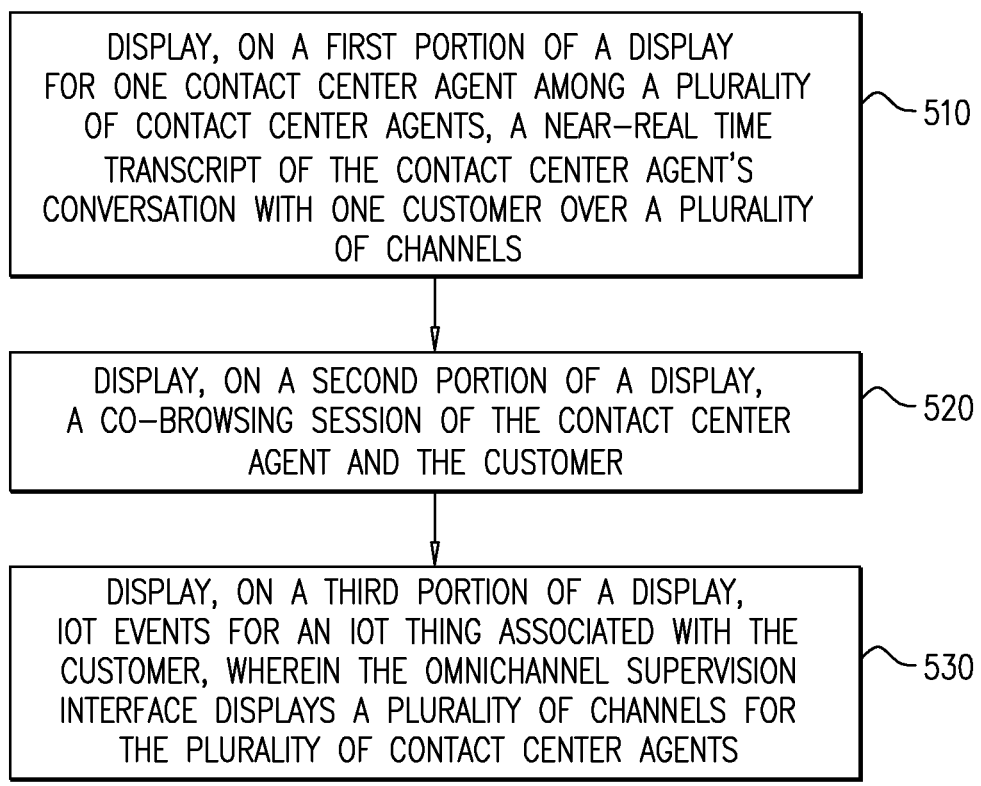
FIG. 5 is a simplified flowchart of one method for implementing the system of FIG. 1.

Reference is now made to FIG. 5, which is a simplified flowchart of one method for implementing the system of FIG. 1. At step 510, a graphics engine (not shown) and driver (not shown) displays on a first portion of a display for one contact center agent among a plurality of contact center agents, a near-real time (i.e. subject to a time delay introduced by network and processing of data) transcript of the contact center agent's conversation with one customer over a plurality of channels. At step 520, the graphics engine displays, on a second portion of the display, a co-browsing session of the contact center agent and the customer. At step 530, the graphics engine displays, on a third portion of the display, IoT events for an IoT thing associated with the customer, wherein the omnichannel supervision interface displays a plurality of channels for the plurality of contact center agents.

It is appreciated that the graphics engine is typically disposed in a computer at the omnichannel customer support center and enables displaying the interface 100, as described herein above.

It is appreciated that software components of the present disclosure may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present disclosure.

It is appreciated that various features of the disclosure which are, for clarity, described in the contexts of separate embodiments may also be provided in combination in a single embodiment. Conversely, various features of the disclosure which are, for brevity, described in the context of a single embodiment may also be provided separately or in any suitable subcombination.

It will be appreciated by persons skilled in the art that the present disclosure is not limited by what has been particularly shown and described hereinabove. Rather the scope of the disclosure is defined by the appended claims and equivalents thereof:

What is claimed is:

1. A method for conducting omnichannel supervision, the method comprising:
   receiving a plurality of feeds of data, each of the feeds being a communication between a call center agent with a customer;
   analyzing the feeds to identify content consistent with predetermined parameters that represent communications that do and do not require supervisory review;
   first sending to an automated bot those of the feeds with content consistent with predetermined parameters that represent communications that do not require supervisory review;
   second sending to a remote computer with a display at least some of those feeds with content consistent with predetermined parameters that represent communications that do require supervisory review;
   third sending to the remote computer, media content for each of the feeds of the second sending, being related to subject matter of each of the feeds but not part of each of the feeds;
   displaying, on the display, a matrix for call center agents, available types of communication channels by which call center agents communicate with customers, and available types of media content;
   populating the matrix on the display with information received from the second sending and third sending, comprising displaying:
      each specific call center agent of the feeds in the matrix;
      a near real time transcript of communication between each specific call center agent and corresponding customer within a region of the matrix that is specific to a type of communication channel over which the communication between the specific call center agent and corresponding customer occurs; and
      media content corresponding to the communication between each specific call center agent and corresponding customer is displayed in near real time within a region of the matrix that is specific to the type of media content.

2. The method of claim 1 wherein available types of communication channels a video channel, a voice channel, and a chat channel.

3. The method according to claim 1, further comprising highlighting or tagging keywords in the transcript.

4. The method according to claim 1 wherein the media content a co-browsing session of the call center agent and the customer.

5. The method according to claim 1 wherein the communication is about a consumer appliance, and the media content is data provided by the consumer appliance.

6. The method according to claim 1 wherein the subject matter of the communication is customer appliance, and the media content is data provided by the consumer appliance.

7. The method of claim 1, further comprising:
   performing pattern recognition analysis of the feeds; and
   selecting, based on the pattern recognition analysis, which of the feeds will undergo the first sending and which of the feeds will undergo the second sending.

8. A non-transitory computer readable media storing instructions which when executed by a system cause the system to perform operations comprising:
   receiving a plurality of feeds of data, each of the feeds being a communication between a call center agent with a customer;
   analyzing the feeds to identify content consistent with predetermined parameters that represent communications that do and do not require supervisory review;
   first sending to an automated bot those of the feeds with content consistent with predetermined parameters that represent communications that do not require supervisory review;
   second sending to a remote computer with a display at least some of those feeds with content consistent with predetermined parameters that represent communications that do require supervisory review;

third sending to the remote computer, media content for each of the feeds of the second sending, being related to subject matter of each of the feeds but not part of each of the feeds;

displaying, on the display, a matrix for call center agents, available types of communication channels by which call center agents communicate with customers, and available types of media content;

populating the matrix on the display with information received from the second sending and third sending, comprising displaying:

each specific call center agent of the feeds in the matrix;

a near real time transcript of communication between each specific call center agent and corresponding customer within a region of the matrix that is specific to a type of communication channel over which the communication between the specific call center agent and corresponding customer occurs; and media content corresponding to the communication between each specific call center agent and corresponding customer is displayed in near real time within a region of the matrix that is specific to the type of media content.

9. The media of claim 8 wherein available types of communication channels a video channel, a voice channel, and a chat channel.

10. The media according to claim 8, the operations further comprising highlighting or tagging keywords in the transcript.

11. The media according to claim 8 wherein the media content a co-browsing session of the call center agent and the customer.

12. The media according to claim 8 wherein the communication is about a consumer appliance, and the media content is data provided by the consumer appliance.

13. The media according to claim 8 wherein the subject matter of the communication is customer appliance, and the media content is data provided by the consumer appliance.

14. The media of claim 8, the operations further comprising:

performing pattern recognition analysis of the feeds; and selecting, based on the pattern recognition analysis, which of the feeds will undergo the first sending and which of the feeds will undergo the second sending.

15. A system, comprising:

a processor;

a non-transitory computer readable media storing instructions which when executed by a processor cause the system to perform operations comprising:

receiving a plurality of feeds of data, each of the feeds being a communication between a call center agent with a customer;

analyzing the feeds to identify content consistent with predetermined parameters that represent communications that do and do not require supervisory review;

first sending to an automated bot those of the feeds with content consistent with predetermined parameters that represent communications that do not require supervisory review;

second sending to a remote computer with a display at least some of those feeds with content consistent with predetermined parameters that represent communications that do require supervisory review;

third sending to the remote computer, media content for each of the feeds of the second sending, being related to subject matter of each of the feeds but not part of each of the feeds;

displaying, on the display, a matrix for call center agents, available types of communication channels by which call center agents communicate with customers, and available types of media content;

populating the matrix on the display with information received from the second sending and third sending, comprising displaying:

each specific call center agent of the feeds in the matrix;

a near real time transcript of communication between each specific call center agent and corresponding customer within a region of the matrix that is specific to a type of communication channel over which the communication between the specific call center agent and corresponding customer occurs; and media content corresponding to the communication between each specific call center agent and corresponding customer is displayed in near real time within a region of the matrix that is specific to the type of media content.

16. The media of claim 15 wherein available types of communication channels a video channel, a voice channel, and a chat channel.

17. The media according to claim 15, the operations further comprising highlighting or tagging keywords in the transcript.

18. The media according to claim 15 wherein the media content a co-browsing session of the call center agent and the customer.

19. The media according to claim 15 wherein the communication is about a consumer appliance, and the media content is data provided by the consumer appliance.

20. The media according to claim 15 wherein the subject matter of the communication is customer appliance, and the media content is data provided by the consumer appliance.

\* \* \* \* \*